Patented Sept. 23, 1924.

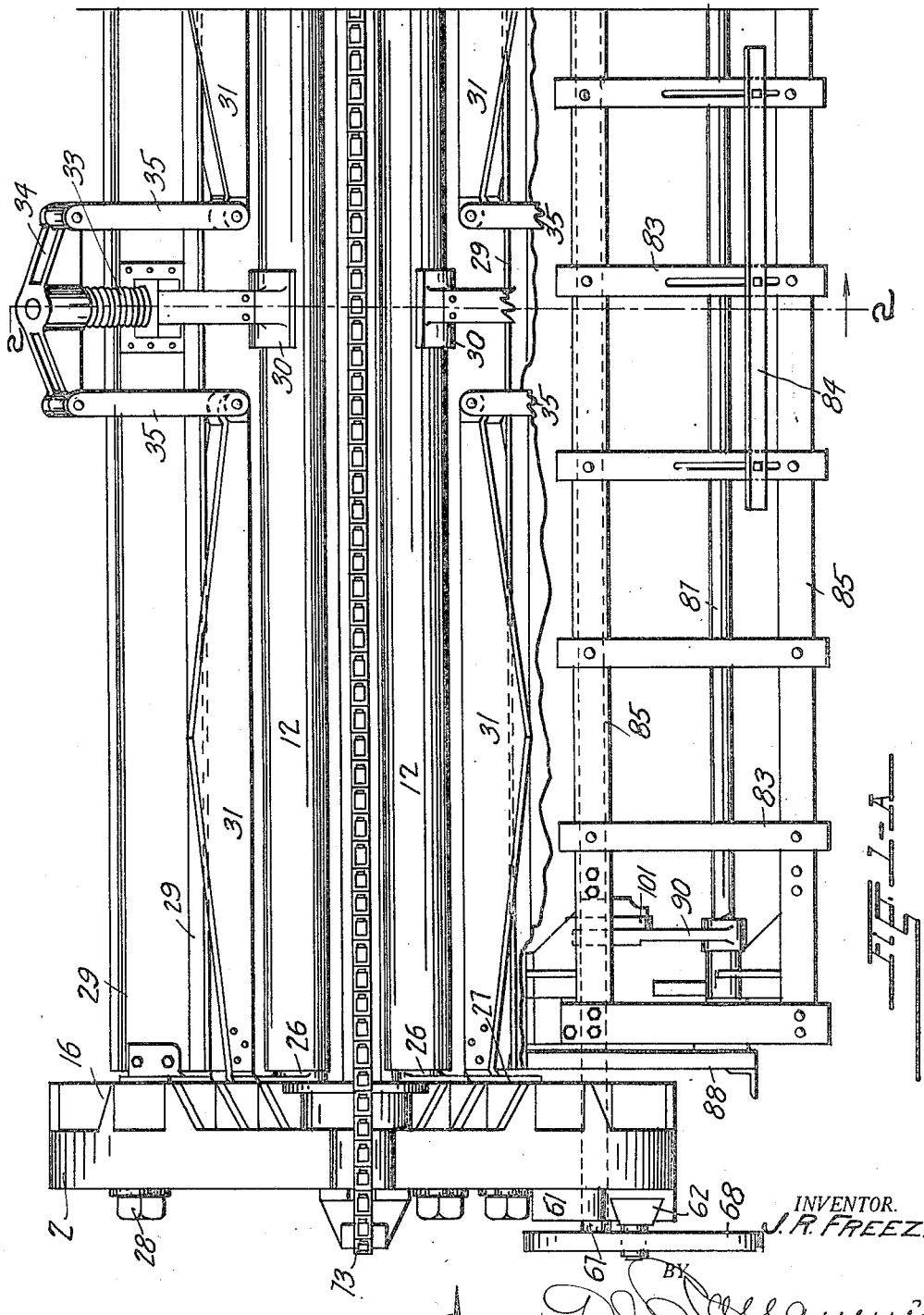

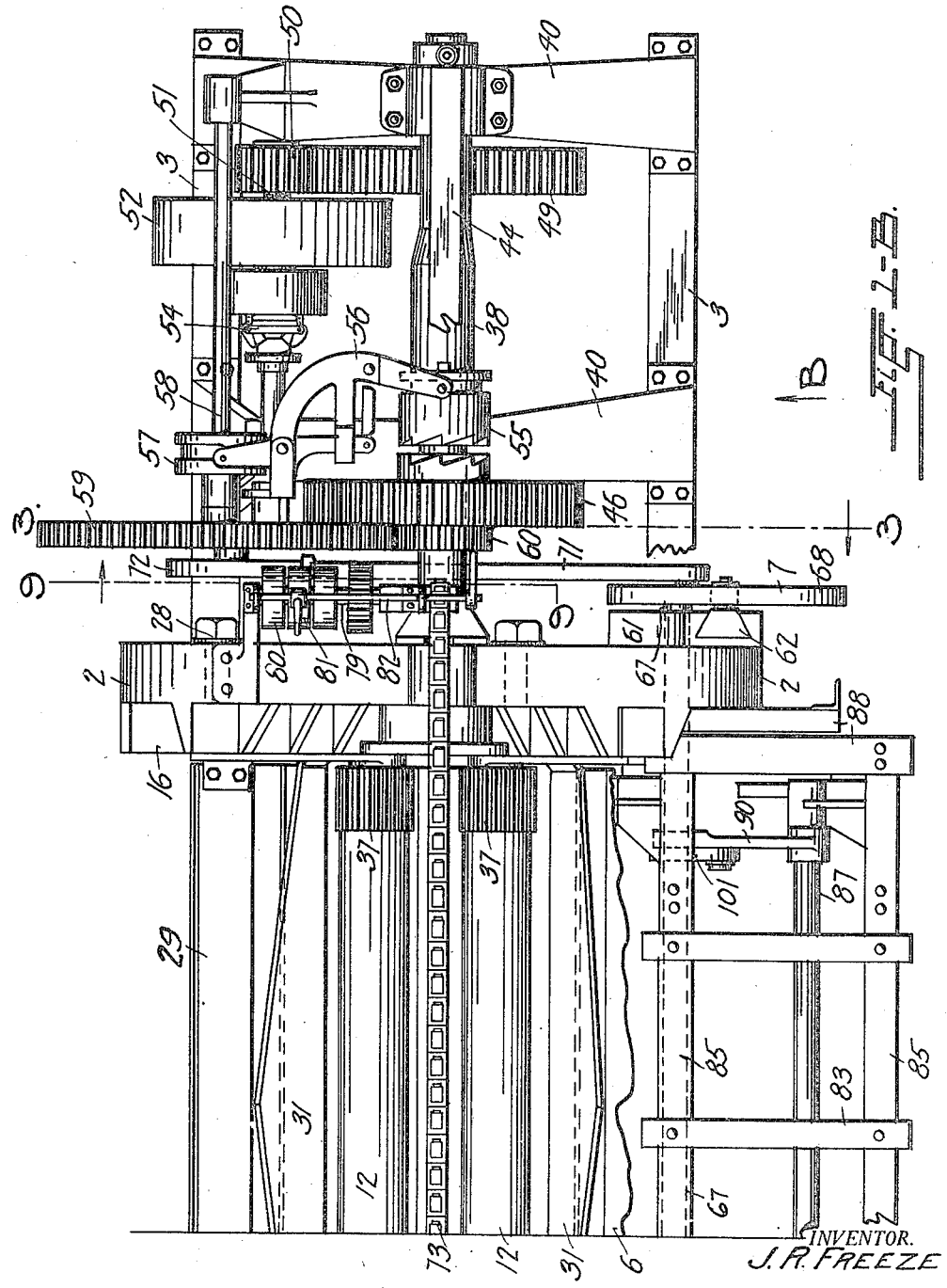

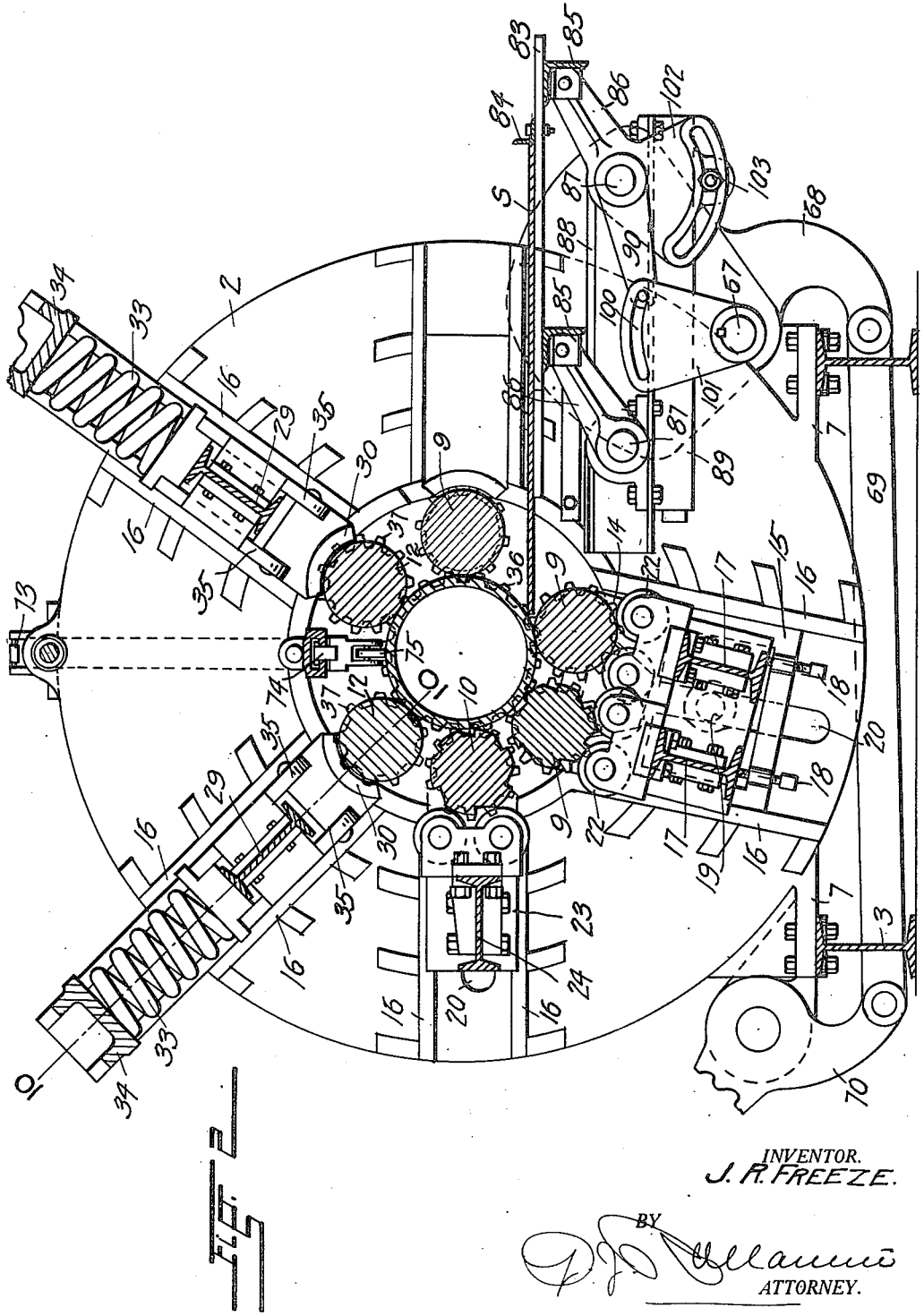

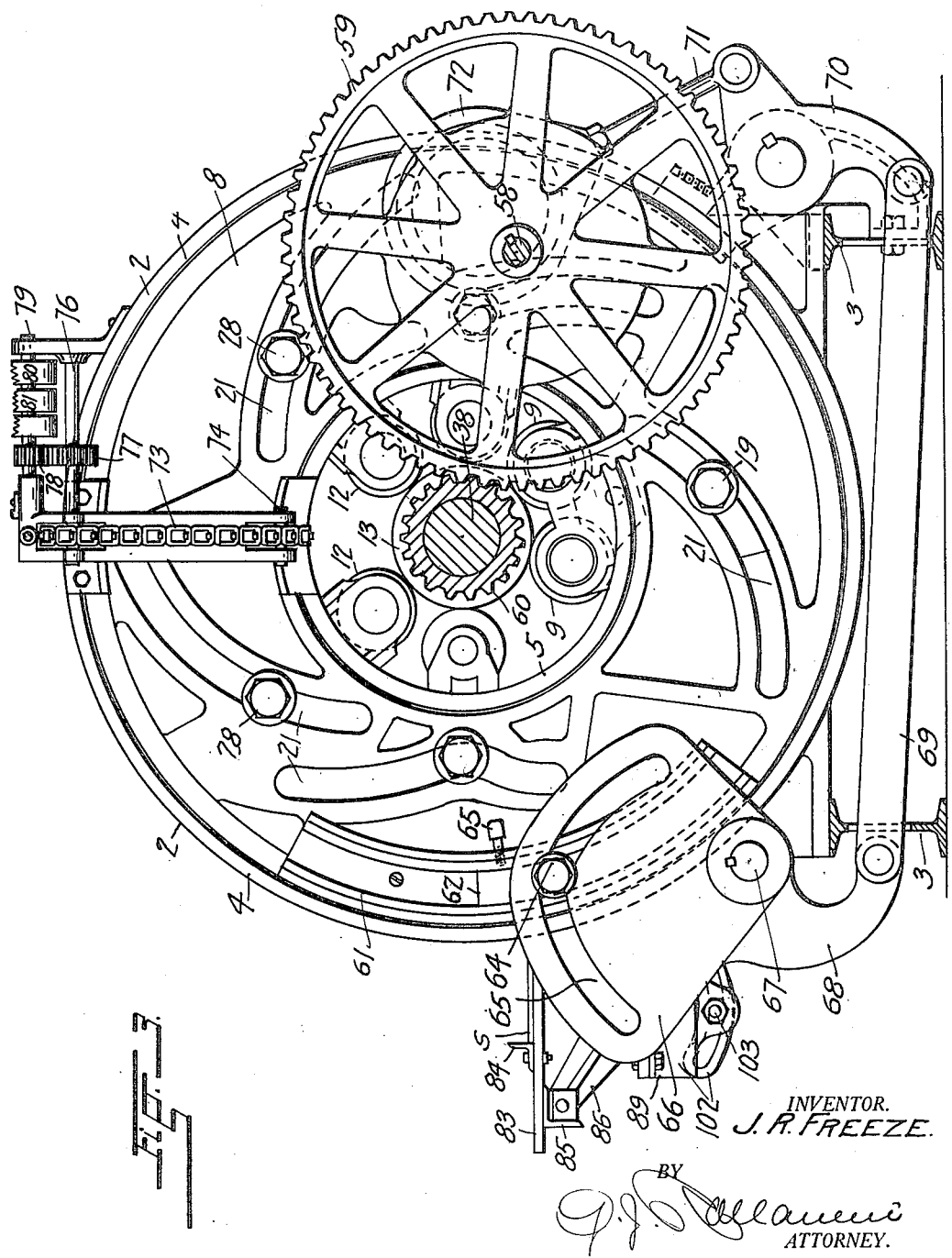

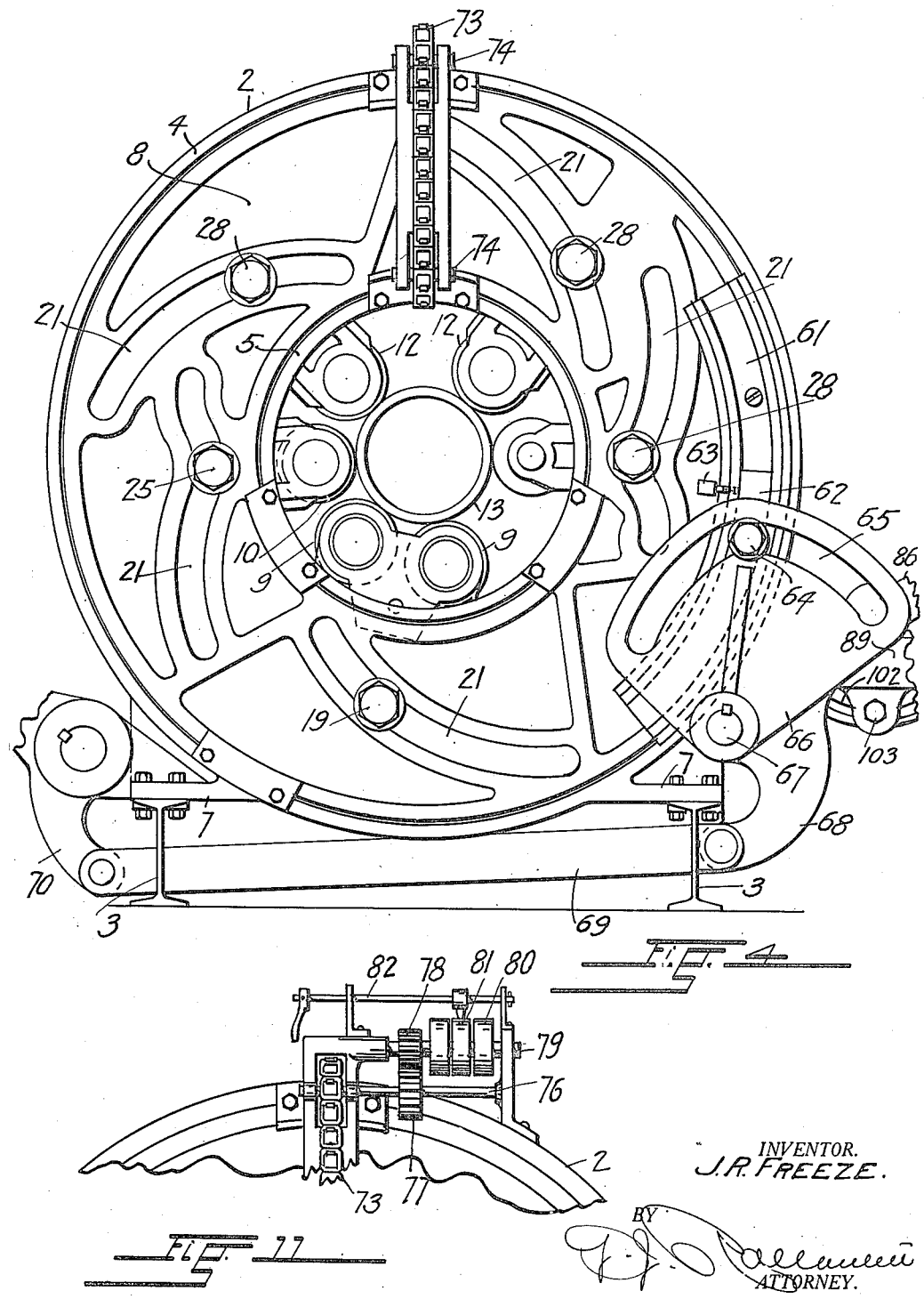

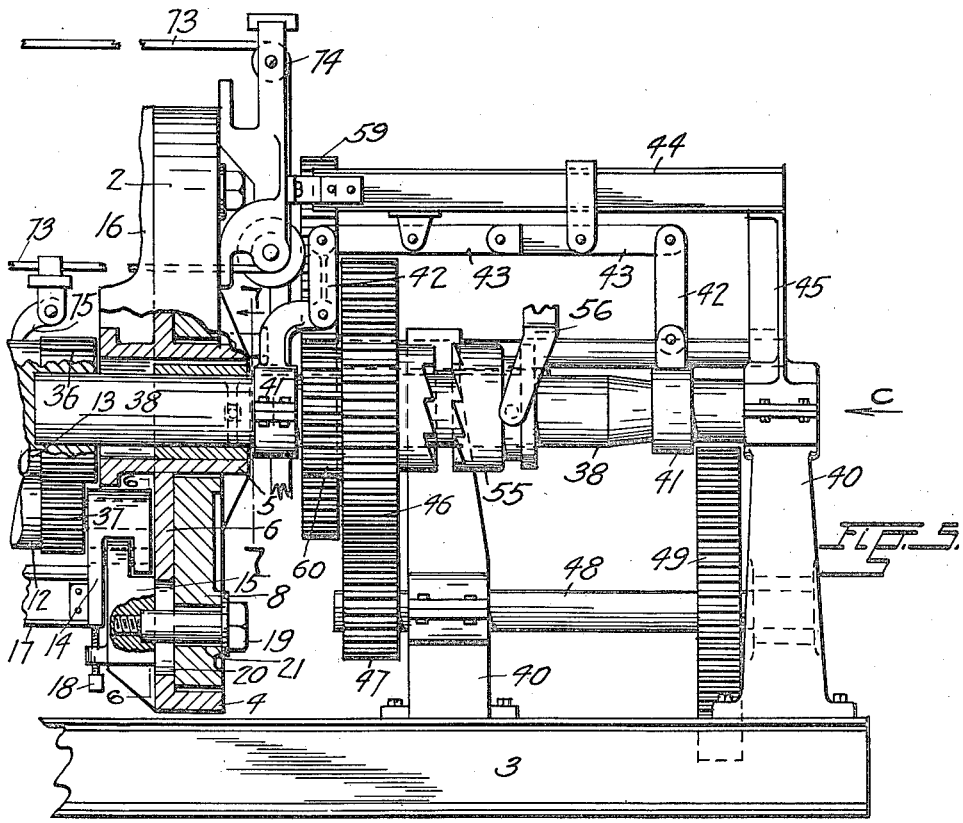

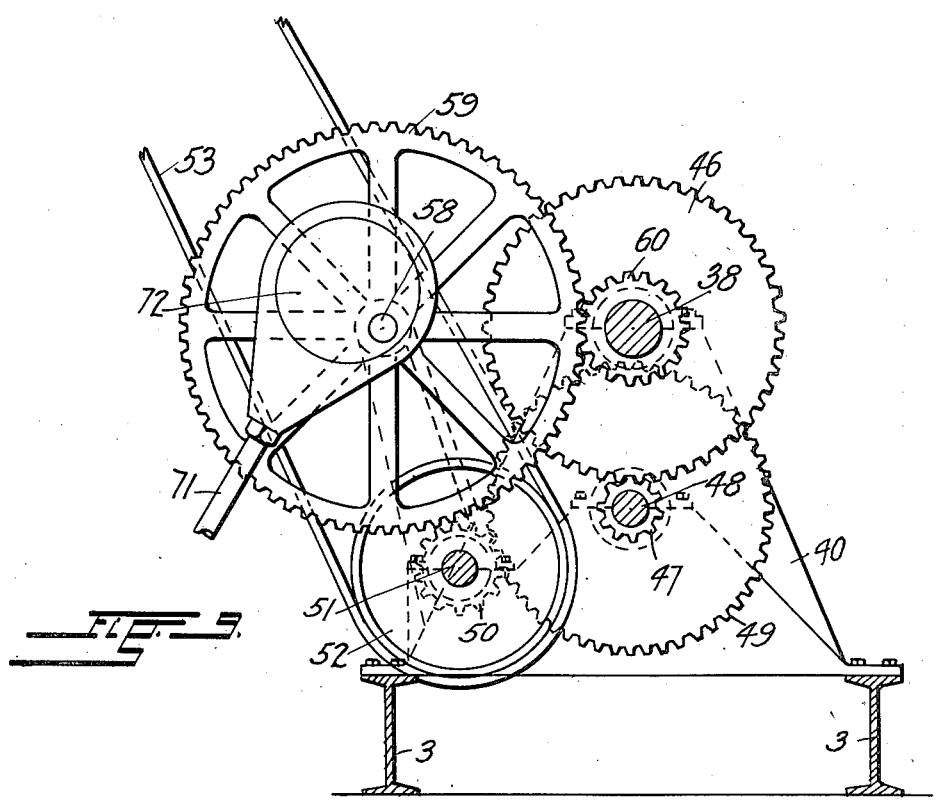
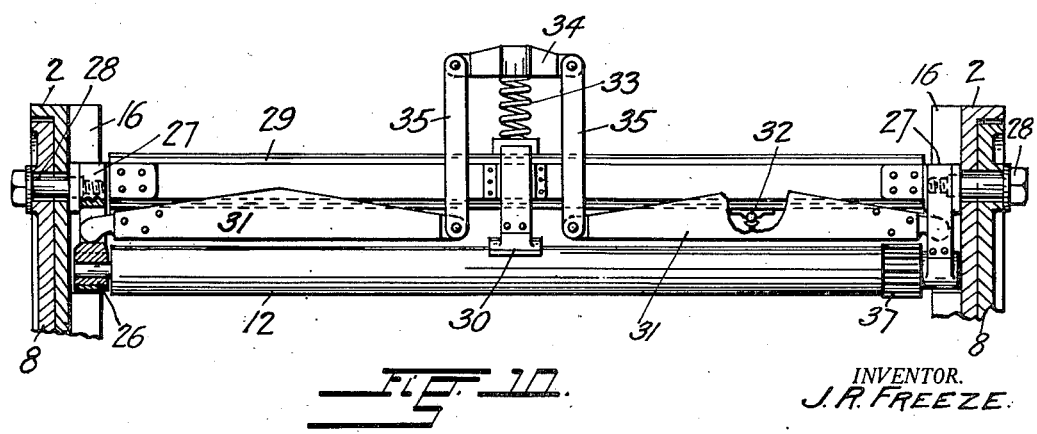

1,509,134

UNITED STATES PATENT OFFICE.

JONATHAN R. FREEZE, OF MIDDLETOWN, OHIO, ASSIGNOR TO RUDD HARDESTY, TRUSTEE, OF DENVER, COLORADO.

PIPE-FORMING MACHINE.

Application filed February 1, 1922. Serial No. 533,357.

*To all whom it may concern:*

Be it known that I, JONATHAN R. FREEZE, a citizen of the United States, residing at Middletown, in the county of Butler and State of Ohio, have invented certain new and useful Improvements in Pipe-Forming Machines, of which the following is a specification.

My invention relates to machines for forming metal pipes and more particularly to machines which in their operation, bend a sheet of metal in cylindrical form with its edge-portions lapping one another for the application of rivets which fasten them together.

It is an object of the present invention to provide in a machine of the character described, an efficient and practical mechanism for the automatic operation of a system of rolls between which the metal pipe is formed.

A further object is to provide an improved appliance for feeding the sheet metal blanks to the rolls, including means for its adjustment in accordance with the diameter of the pipes formed in the operation of the machine; another object of the invention is to provide a simple and effective method of adjusting the forming rolls of the machine according to the size of the arbor or mandrel around which the pipe is bent, and still further objects reside in details of construction and a novel arrangement of elements as will fully appear in the course of the following description.

An embodiment of my invention in the most practical form at present known to me, has been illustrated in the accompanying drawings in which like characters of reference designate corresponding parts throughout the several views, and in which Figures 1ᴬ and 1ᴮ represent conjointly a plan view of the machine;

Fig. 2, a section on the line 2—2, Fig. 1ᴬ, drawn to a larger scale;

Fig. 3, an enlarged section taken on the line 3—3, Fig. 1ᴮ;

Fig. 4, an enlarged end-view of the machine looking in the direction of the arrow A, Fig. 1ᴬ;

Fig. 5, a partially sectional side elevation of the operating mechanism of the machine looking in the direction of the arrow B, Fig. 1ᴮ;

Fig. 6, an enlarged section on the line 6—6, Figure 5;

Fig. 7, a section on the line 7—7, Figure 5;

Fig. 8, an end view of the main-shaft bearing at the rear end of the machine, looking in the direction of the arrow C, Fig. 5;

Fig. 9, a section taken on the line 9—9, Fig. 1ᴮ;

Fig. 10, a section on the line 10—10, Fig. 2, drawn to a reduced scale; and

Fig. 11, a fragmentary view showing in elevation, the driving mechanism for the endless chain by which the finished pipes are removed from the mandrel of the machine around which they are formed.

Referring to the drawings by numerical reference characters, the machine comprises two circular supports 2 which stand in axial alinement upon a base frame preferably composed of parallel I-beams 3.

Each of the supports has two concentric bearing-flanges 4 and 5 connected at their inner edges by an integral web 6, and feet 7 which project from the outer flange for their connection with the I-beams.

Rotatably mounted between the flanges of the supports are circular heads 8 which support and operate a system of feed-rollers 9 and 10 and pressure or forming rollers 12 placed around a central arbor or mandrel 13 upon which the pipes are formed in the operation of the machine.

The two feed rollers 9 at the front of the machine which engage the metal sheet of which the pipe is formed as it is fed to the mandrel by the reciprocating feed table hereinafter to be described, are rotatably mounted in pivoted boxes 14 on blocks 15 which are radially slidable on the head-supports between guide ribs 16 on the opposed surfaces of the webs thereof. The boxes are connected by I-beams 17, and they are engaged by set screws 18 on the blocks for their pivotal adjustment.

Stud bolts 19 on the blocks extend through radial slots 20 in the webs of the head supports and through curved cam-slots 21 of the heads, for the purpose of periodically separating the rollers from the surface of the mandrel by a partial rotation of the heads in the operation of the machine.

Anti-friction rollers 22 mounted on a bracket fastened to the beams which connect the boxes, support the rollers intermediate of their ends.

The feed roller 10 is mounted singly in a manner very similar to that of the other rollers. Its boxes 23 are connected by a single I-beam 24, and they are either directly or through the medium of slide blocks, radially movably mounted between guide ribs 16 on the head-supports. Stud bolts 25 on the blocks or boxes extend through curved slots 21 of the heads 8 and through radial slots 20 in the supports 2 thereof.

The pressure rollers 12 are mounted in boxes 26 which move in slots of blocks 27 slidably held between the guide ribs of the head-bearings, the blocks being as before, co-operatively associated with the heads by stud bolts 28 extending through curved slots thereof and through radial slots in the webs of the supports.

The two sliding blocks 27 are connected by beams 29 which carry shoes 30 for engagement with the rollers between their ends, and the sliding boxes 26 in which the rollers are supported, are engaged by the ends of levers 31 which are fulcrumed on the beam as at 32 and which at their opposite ends, are supported upon a spring 33 through the medium of a cross bar 34 and pairs of links 35.

The spring extends at one end in a seat at the central portion of the connecting beam and its opposite end is engaged by the cross bar so that the roller is yieldingly held in contact with the mandrel, uniformly along the entire length thereof.

The mandrel and the rollers arranged as hereinbefore described, are connected to rotate in unison by gear wheels 36 and 37 at one of their ends.

The mandrel 13 upon which the pipe is formed, consists of a hollow cylinder which at one of its ends is fitted upon the main shaft 38 of the operating mechanism of the machine.

The shaft extends at its ends in boxes 39 which have a limited upward movement in bearings on standards 40 mounted on the base beams at the rear end of the machine, and it is, by means of collars 41 and links 42, suspended from a pair of normally alined equalizing levers 43 which are fulcrumed on a beam 44 connected between an upright 45 on one of the standards and the adjacent head-support 2.

The levers in conjunction with the upwardly movable boxes, permit of the shaft alining itself with the mandrel connected at its end, to prevent binding and undue stress on the bearings and other parts of the mechanism in the operation of the machine, should the mandrel be out of true.

A gear wheel 46, loosely mounted on the shaft, meshes with a pinion 47 on a counter shaft 48 which, through the medium of a gear wheel 49 and a pinion 50, is operatively connected with the drive shaft 51.

The shafts 48 and 51 are mounted in boxes on the standards and a pulley 52 on the drive shaft is, by means of a belt 53, connected with a convenient source of power. The operative connection between the driving pulley and its shaft is controlled by a manually adjustad clutch 54.

A sliding clutch 55, mounted for rotation with the main shaft 38 by a spline-and-groove connection, secures the rotative continuity of the gear wheel 46 with said shaft during determinate periods in the operation of the machine and it is to this end, as best shown in Fig. 1ᴮ of the drawings, operatively connected with a cam wheel 57 through the medium of a system of levers 56.

The cam wheel is mounted on a shaft 58 which in the operation of the machine, is rotated through the medium of a gear wheel 59 meshing with a pinion 60 which is rigidly connected with the gear wheel 46 on the main shaft 38.

Each of the heads 8 which, as hereinbefore described, are mounted for rotation between the flanges of the two bearings at opposite ends of the machine, has a concentric dove-tail slideway 61 in which a correspondingly formed slide block 62 is held in an adjusted position by means of a set screw 63.

The slide blocks of the two heads have headed studs 64 which extend freely through cam slots 65 of segments 66 at opposite ends of a rocker shaft 67 which is supported in bearings on the head-supports 2. One of the segments has a downwardly extending crank arm 68, which by means of a bar 69, is operatively connected with a correspondingly positioned arm of a bell crank 70 mounted in a bearing on one of the head supports of the machine. The other arm of the bell crank is pivotally connected with the rod 71 of the strap of an eccentric 72 which is carried upon the before mentioned shaft 58.

The mechanism for removing the formed pipe from the mandrel, comprises an endless chain 73 which is trained around rollers 74 on the two head-supports 2 and which carries a drag pawl 75 for engagement with the rear end of the pipe. One of the rollers is mounted on a shaft 76 which, as best shown in Fig. 11, is by means of gear wheels 77 and 78, connected with a drive shaft 79, and the two shafts are supported by brackets which are fastened to one of the head-supports and the before mentioned beam 44 on which the levers 43 are fulcrumed.

The shaft 79 carries fast and loose pulleys 80 and 81, and a belt shift 82 is mounted above the shaft to move a belt connected with a conveniently disposed line shaft or other source of power, from one pulley to another.

The sheets from which the pipes are formed, are fed between the foremost lower feed roller and the mandrel at the front of the machine through the medium of a reciprocating table which is vertically adjustable to regulate its position in accordance with the diameter of the mandrel.

The table top is preferably made in skeleton form, of slats fastened upon stringers of angle section and it is adjustably supported upon a sliding carriage which, in the operation of the machine, moves it periodically to and from the rollers for the purpose of feeding the metal sheets, of which the pipes are formed, to the surface of the mandrel.

The carriage comprises two parallel shafts 87 mounted for rotation in boxes on relatively transverse beams 88 which are movably supported in horizontal slideways 89 on the head-supports of the machine.

The connection between the carriage and the table top is established by means of two pairs of parallel arms 86 which extend upwardly from the shafts 87 in pivotal relation to the stringers 85.

The carriage is in the operation of the machine, actuated at regular intervals by rotation of the before mentioned rocker shaft 67, which to this end has a pair of segmental arms 101 provided with concentric slots 100 which co-operate with wrists on crank arms 90 extending downwardly from one of the shafts 87.

To provide for the up and downward adjustment of the table, the arms 86 on one of the shafts of the carriage, are extended into slotted segments 102 which by means of bolts 103, are clamped in their adjusted positions on the transverse beams.

In the operation of the machine, the metal sheet of which the pipe is formed, is placed on the feed table in engagement with the adjustable flange 84 thereof.

After the clutch 54 on the drive shaft has been adjusted to connect with the driving pulley, the main shaft 38 is rotated through the medium of the gearing, with the result that the mandrel revolves about its axis and imparts a corresponding movement in the opposite direction to the feed and forming rollers.

The simultaneously rotating shaft 58 of the eccentric imparts through the medium of the bell crank 70 and the connecting bar 69, a rocking motion to the shaft 67 and the therewith connected cam segments 66 which by their movement along the stud bolts 64 of the rigidly fastened blocks 62 cause the rotary heads 8 to move alternately in opposite directions and the feed table is at the same time moved back and forth by its operative connection with the rocker shaft 67, through the medium of the slotted arm 101.

The different elements of the machine being thus connected for conjunctive operation, the members of their actuative mechanisms are arranged and relatively proportioned so that, in each period of operation, the following actions take place in regular succession:

Premising that the feed and pressure rolls are separated from the arbor 13 subsequent to the removal of the pipe formed in a previous operation, they are returned to their operative position in engagement with the mandrel, by two revolutions of the main shaft 38, it being understood that owing to the different diameters of the gearwheel 59 and the pinion 60, the shaft 38 makes four revolutions while the shaft 58 makes one.

The feed table commences its feeding movement soon after the rolls have closed together and the rolls remain in this position during the following two revolutions of the shaft 38 after which they are again separated from the mandrel in the next revolution to permit of the removal of the formed pipe through the medium of the drag chain which is put in motion by manual adjustment of the belt shift.

The sheet fed between the foremost feed roller and the arbor, which rotate in opposite directions, is forcibly curved around the arbor by the pressure of the different rolls and during the two revolutions of the arbor in which the rolls are in contact therewith, it is bent in true cylindrical form with its edge-portions overlapping one another.

The rollers are subsequently separated from the arbor to permit of the removal of the pipe as hereinbefore explained, and the table is at the same time returned to its original position.

It will be understood that the movements of the rollers to and from the arbor are produced by the travel of the studs 19 and 28 connected to the roller-supporting boxes and blocks, in the curved slots 21 of the circularly reciprocating heads, and the consequent sliding motion of the boxes and blocks between the guide ribs on the opposed surfaces of the head-supports.

When in the operation of the machine, the feed and bending rollers are separated from the mandrel, it is desirable that for the purpose of bringing their gear wheels in mesh with that of the mandrel when they are subsequently closed together, the mandrel be temporarily disconnected from the driving mechanism.

This is automatically accomplished through the medium of the sliding clutch 55 which by rotation of the cam is separated from its correlative on the gear wheel 46 during the periods the rollers are separated from the mandrel, it being understood that owing to its momentum, the shaft 58 continues its rotationu during the brief intervals in which the rotative continuity of the gear wheel 46 with the shaft 38 is broken.

In order to change the mandrel to one of larger or smaller diameter, it is removed from the shaft with which it is connected, after the feed and pressure rollers have been separated from its surface.

The other mandrel is then placed on the shaft, and the rotary heads are adjusted by loosening the set screws 63 of the sliding blocks 62 to cause the rollers to engage with the mandrel at the end of their inward movement as before.

The feed table is at the same time raised or lowered to bring it in line with the line of contact between the mandrel and the foremost feed roller, by loosening the bolts 103 and turning the shafts 87 of the arms 86 on which the table is supported.

In order to insure a uniform movement of the metal sheet around the mandrel, the feed rollers are provided with longitudinal grooves to form shoulders with which the sheet engages.

Having thus described my invention, what I claim and desire to secure by Letters Patent is:

1. In a pipe forming machine, a mandrel, head supports at opposite ends thereof, rotary heads on the supports, rollers arranged about the mandrel and mounted on said heads to be separated from the mandrel by a rotary movement of the same, mechanism for automatic rotary reciprocation of the heads, and means for adjusting the automatic mechanism on the heads to vary the normal position of the rollers relative to the axis of the mandrel.

2. In a pipe forming machine, a mandrel, head supports at opposite ends thereof, rotary heads on the supports, bending rollers arranged about the mandrel and mounted on said heads to be separated from the mandrel by a rotory movement of the same, and mechanism for automatic rotary reciprocation of the heads, including connections adjustable on the heads, to permit of adjusting the latter on their supports to vary the working distance of the axes of the rollers relative to the axis of the mandrel.

3. In a pipe forming machine, a mandrel, rotary heads at opposite ends thereof, having cam-slots, bearings slidable along said slots by rotary movement of the heads, bending-rollers in the bearings, a rocker shaft, cam-members on the shaft, and studs adjustably fastened on the heads, in operative engagement with the cam-members.

4. In a pipe forming machine, a mandrel, rotary heads at opposite ends thereof, having cam-slots and concentric guide ways, bearings slidable along said slots by rotary movement of the heads, bending rollers in the bearings, a rocker-shaft, cam-members on the shaft, and studs adjustably fastened in said guide ways, and operatively engaging with the cam-members.

5. In a pipe-forming machine, a mandrel, heads mounted for rotary reciprocation at opposite ends thereof, rotary bending rollers arranged around the mandrel and associated with the heads to move to and from the mandrel by reciprocating movement of the heads, mechanism for rotation of the rollers, and means associated with said mechanism for automatic movement of the heads at determinate periods in the operation thereof.

6. In a pipe forming machine, a mandrel, rotary heads at opposite ends thereof, rotary bending rollers arranged about the mandrel in geared connection therewith, and mounted on the heads to be separated from the mandrel by a rotary movement of the heads, a shaft with which the mandrel is connected, a loose gear-wheel on the shaft, a clutch to connect the gear-wheel with the shaft, a second shaft, a gear-wheel on the second shaft engaging with the first mentioned gear-wheel, means for imparting a rotary reciprocating movement to the heads by rotation of the second shaft, and a cam operated by movement of the second shaft, in operative connection with the clutch.

7. In a pipe forming machine, movably mounted boxes, a rotary shaft supported therein, equalizing levers supporting the shaft, a mandrel removably connected at an end of the shaft, and bending rollers arranged about the mandrel and connected to move in unison therewith.

8. In a pipe forming machine, a mandrel, supports at opposite ends thereof, rotary heads on said supports, slides guided on the supports, means for moving the slides by rotation of the heads, boxes pivoted on the slides, rollers mounted in said boxes and adapted to bend a blank upon the mandrel, and mechanism for rotary reciprocation of the heads.

9. In a pipe forming machine, a mandrel, supports at opposite ends thereof, rotary heads on said supports, connected slides guided on the supports, means for movement of the slides by rotation of the heads, boxes slidable on the slides, a roller in said boxes, adapted to bend a blank upon the mandrel, and spring-pressed equalizing levers mounted on the connection of the slides, in engagement with said boxes.

10. In a pipe forming machine, a mandrel, supports at opposite ends thereof, rotary heads on said supports, connected slides guided on the supports, means for movement of the slides by rotation of the heads, boxes slidable on the slides, a roller in said boxes adapted to bend a blank upon the mandrel, and equalizing levers mounted on the connection of the slides, in engagement with said boxes.

11. In a pipe forming machine, a rotary mandrel, radially movable rotary rollers adapted to bend a blank around the mandrel, said rollers and said mandrel being geared to rotate in unison, and operating mechanism including automatic means to intermittently move the rollers to and from the mandrel, and means to rotate the mandrel while the rollers are closed upon the same.

12. In a pipe forming machine, a rotary mandrel, radially movable rotary rollers adapted to bend a blank around the mandrel, said rollers and said mandrel being geared to rotate in unison, a reciprocating table for feeding blanks to the mandrel, and operating mechanism including means to intermittently move the rollers to and from the mandrel, means for rotation of the mandrel, and means for moving the table to the mandrel while the rollers are closed upon the same.

13. In a pipe forming machine, a rotary mandrel, radially movable rotary rollers adapted to bend a blank around the same, said rollers and said mandrel being geared to rotate in unison, mechanism including means to intermittently move the rollers to and from the mandrel, and means for rotation of the mandrel, and automatic means for feeding blanks to the mandrel while the rollers are closed upon it.

14. In a pipe forming machine, a mandrel, a plurality of radially movable rotary bending rolls co-operating with the mandrel to bend a sheet fed transverse of their axes, in cylindrical form, and automatic means to move the rolls alternately to and from the mandrel in constant parallel relation thereto.

15. In a pipe forming machine, a mandrel, a plurality of radially movable rotary bending rolls co-operating with the mandrel to bend a sheet fed transverse of their axes, in cylindrical form, mechanism for rotation of the rolls, and means co-operative with said mechanism to move the rolls alternately to and from the mandrel.

16. In a pipe forming machine, a rotary mandrel, rotary bending rolls co-operating with the mandrel to bend a sheet fed transverse of their axes, in cylindrical form, mechanism for rotation of the mandrel and the rolls, and means co-operative with said mechanism to automatically separate the rolls from the mandrel between intermittent periods in the operation of the mechanism, during which the mandrel makes two revolutions.

17. In a pipe forming machine, a mandrel, head-supports at opposite ends thereof, rotary heads on the supports, having cam slots, bearings radially slidable on the support, with relation to the axis of the mandrel, and engaging with the cam slots, the cam slots being adapted to cause the bearings to move on the supports by rotary reciprocation of the heads, rotary bending rollers supported in the bearings, mechanism for rotation of the rollers, and means co-operating with said mechanism for the automatic operation of the heads.

18. In a pipe forming machine, a rotary mandrel, adjustable bending rollers in geared connection therewith, mechanism for rotation of the mandrel, means to automatically separate the rollers from the mandrel at a determinate period in the operation of the mechanism, and an automatic clutch to discontinue the operative connection between the mandrel and the mechanism during said period.

19. In a machine for forming pipes, opposite supports, a rotary shaft on one of said supports, a hollow mandrel lengthwise slidably supported upon said shaft, to be removed therefrom past the other support, and rollers mounted on the supports in co-operative association with the mandrel to bend a sheet fed transverse to their axes of rotation, in cylindrical form around the mandrel, and means for simultaneous radial adjustment of the rollers to maintain their working relation to mandrels of different diameters.

20. In a pipe forming machine, a rotary shaft, a separately supported mandrel in end-to-end connection therewith, rotary rollers co-operating with the mandrel to bend a sheet fed transverse to their axes of rotation, in cylindrical form, and bearings for the shaft, capable of automatic adjustment to maintain the axial alinement of the shaft and the mandrel.

21. In a pipe forming machine, a removably mounted rotary mandrel, and a plurality of rollers co-operating with the mandrel for bending a sheet fed transverse to their axes of rotation, in cylindrical form, said rollers being mounted for simultaneous pivotal adjustment in constant parallel relation to the mandrel.

22. In a pipe forming machine, a rotary mandrel, and rollers co-operating with the mandrel for bending a sheet fed transverse to their axes of rotation, in cylindrical form, said rollers being mounted for lateral movement to and from the mandrel and for pivotal adjustment in constant parallel relation to the mandrel.

23. In a pipe forming machine, a mandrel, rollers co-operating with the mandrel for bending a sheet fed transverse to their axes of rotation, in cylindrical form, the rollers being adapted for automatic lateral motion away from the mandrel, and resilient means to yieldingly oppose the lateral movement of the rollers.

24. In a pipe forming machine, a mandrel, a roller co-operating with the mandrel to bend a sheet fed transverse to their axes of rotation, in cylindrical form, the roller being mounted for lateral motion, and a spring-pressed lever-system acting upon the roller at opposite ends thereof to yieldingly resist its movement away from the mandrel.

25. In a pipe forming machine, a mandrel, rotary bending rollers co-operating therewith for bending a sheet fed transverse to their axes of rotation, in cylindrical form, and a horizontally reciprocating feed table having a combined vertical and horizontal adjustment to adapt it for use in connection with a mandrel of different diameter.

26. In a pipe forming machine, a mandrel, laterally movable rollers co-operating therewith for bending a blank fed transverse to their axes of rotation, in cylindrical form, automatic mechanism to intermittently separate the rollers from the mandrel for removal of the formed pipe, a reciprocating feed table, and automatic means synchronizing with said mechanism to move the table to the mandrel and the rollers while they are closed together for co-operative action, and to withdraw the same during the periods of separation of the rollers from the mandrel.

27. In a machine of the character described, a pipe-forming element comprising a mandrel and bending rollers co-operating therewith to form a blank fed transverse to their axes of rotation, in cylindrical form, the rollers being laterally movable for periodic separation from the mandrel, mechanism for the operation of said element, including a rocker shaft, a feed-element for moving blanks to the pipe-forming element, including a horizontally reciprocating table, and means for the operation of the feed-element by movement of the rocker shaft.

In testimony whereof I have affixed my signature.

JONATHAN R. FREEZE.